United States Patent [19]

McClure et al.

[11] 4,086,600
[45] Apr. 25, 1978

[54] METHOD FOR PRODUCING HALF-TONE, VARIABLE-DENSITY SEISMIC TRACE RECORDINGS

[75] Inventors: Carroll D. McClure; John D. Hodge, Jr., both of Dallas, Tex.

[73] Assignee: Mobil Oil Corporation, New York, N.Y.

[21] Appl. No.: 705,724

[22] Filed: Jul. 15, 1976

[51] Int. Cl.² ............................................. G01D 9/28
[52] U.S. Cl. ............................... 346/1; 340/15.5 DS; 346/33 C; 346/46; 346/110 R; 358/298
[58] Field of Search ............... 346/110 R, 108, 33 C, 346/1, 46; 358/298, 302; 355/20; 96/45, 38, 116; 354/6; 340/15.5 DS

[56] References Cited

U.S. PATENT DOCUMENTS

| | | | |
|---|---|---|---|
| 2,183,204 | 12/1939 | Reynolds | 96/116 |
| 3,549,939 | 12/1970 | Smitzer | 346/110 R X |
| 3,704,450 | 11/1972 | Smith | 340/172.5 |
| 4,014,030 | 3/1977 | Stark | 358/298 X |

Primary Examiner—Joseph W. Hartary
Attorney, Agent, or Firm—C. A. Huggett; George W. Hager, Jr.

[57] ABSTRACT

In a seismic data processing system, seismic data in channel-sequential format intensity modulates the electron beam of a cathode-ray tube. A photographic drum plotter provides a recording of the seismic data displayed on the face of the cathode-ray tube. A screen of multilined squares is placed in contact with the photographic film on the drum plotter so that the seismic data is recorded in a half-tone, variable-density format.

4 Claims, 3 Drawing Figures

METHOD FOR PRODUCING HALF-TONE, VARIABLE-DENSITY SEISMIC TRACE RECORDINGS

BACKGROUND OF THE INVENTION

Seismic data representing a plurality of seismic channels is conventionally stored on magnetic tape for further data processing. In one such data processing operation, the information stored on the magnetic tape is used to modulate a cathode-ray tube so as to display the information on the face of the cathode-ray tube. Such display is photographically recorded by means of a conventional drum plotter. Rotation of the drum plotter past the face of the cathode-ray tube results in a seismic trace recording on the photographic material surrounding the drum plotter. In order to plot additional seismic trace recordings adjacent to previous recordings, the cathode-ray tube is mounted on a movable assembly which is automatically stepped laterally to the next seismic trace recording position. An illustration of such a data processing operation is set forth in FIG. 1 of the accompanying drawings to assist in an understanding of the prior art. For a more detailed description of such operation, reference may be had to U.S. Pat. Nos. 3,704,450; 3,714,663; and 3,886,526.

When the seismic information from the magnetic tape unit is applied to the H-axis input of the CRT, the direction of travel of the electron beam across the face of the CRT is modulated so as to produce a variable-amplitude photographic recording on the drum plotter. However, should this same seismic information be applied to the Z-axis input of the CRT, the brightness of the electron beam will be modulated as it travels across the face of the CRT so as to produce a variable-density seismic trace recording on the drum plotter.

SUMMARY OF THE INVENTION

In accordance with the present invention, seismic data is recorded in a plurality of seismic channels and sequentially applied by channel to intensity modulate a variable-brightness display. The seismic data is recorded as it is sequentially displayed by channel to produce a variable-density seismic trace recording of the plurality of seismic channels. Located between the display and the recorder is a means for screening the light from the display so as to break the images of the seismic data on the recorder into a plurality of varying size dots depending upon the brightness of the display, thereby producing a half-tone, variable-density recording of each seismic trace.

In a further aspect, the data representing at least one selected parameter of the seismic data is applied sequentially by channel to intensity modulate the brightness of the display. The recording means is exposed to the screened light from the display, whereby the images of the selected parameter of the seismic data are recorded as a half-tone, variable-density recording for each seismic channel in side-by-side relationship. This recording process is repeated for each of a plurality of selected parameters of the seismic data to produce a half-tone, variable-density recording for each such selected parameter for each seismic channel.

In a still further aspect, a composite reproduction of the plurality of half-tone, variable-density recordings is made with each selected parameter being uniquely represented by a different color. Such parameters may, for example, represent frequency distribution, magnitude variations, or polarity changes.

In a preferred embodiment of the present invention, seismic signals in a plurality of seismic channels are sequentially applied by channel to a cathode-ray tube to intensity modulate the electron beam as it sweeps across the face of the cathode-ray tube. Each successive sweep of the electron beam is recorded to produce a variable-density seismic trace for each of the plurality of seismic channels in side-by-side relationship. Located between the cathode-ray tube and the recording means is a half-tone screen having a plurality of crosslined squares. This screen breaks the images of the electron beam onto the recording means into a plurality of varying size dots, depending upon the brightness of the electron beam, thereby producing a half-tone, variable-density recording of each seismic trace. The recording means is photographic film and the half-tone screen is placed in contact with the film so as to produce intermediate gray tones between black and white on the film.

DESCRIPTION OF THE PREFERRED EMBODIMENT

Figure 1:
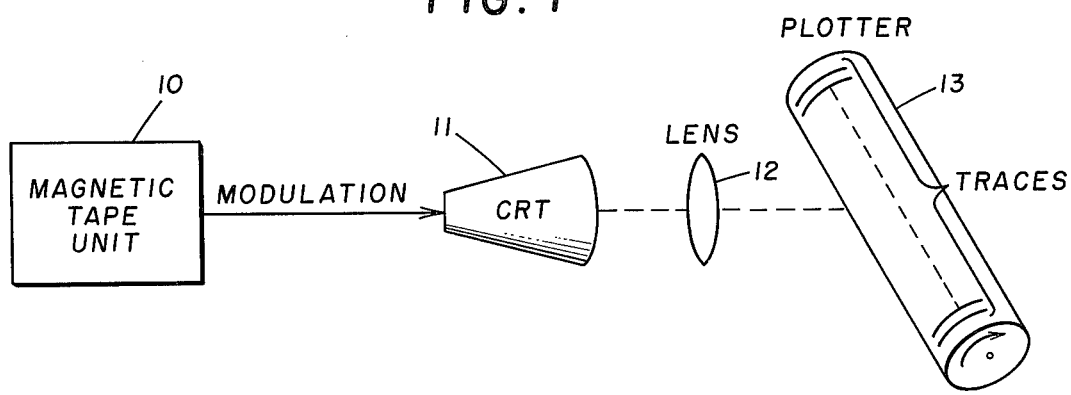
FIG. 1 is a block diagram schematic of one embodiment of the present invention.
Figure 2:
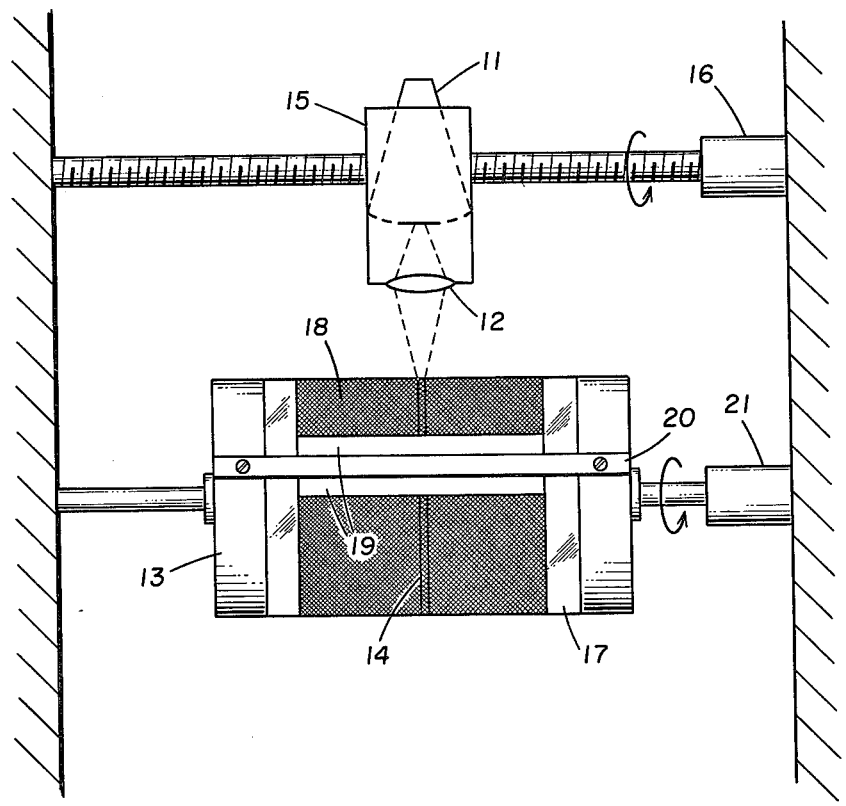
FIG. 2 illustrates that portion of FIG. 1 embodying the recording means of the present invention.

Referring to FIG. 2, there is shown in detail a variable-brightness display and a recorder for producing variable-density seismic trace recordings. Seismic data in serial-by-trace format from magnetic tape unit 10 is applied as the modulation input to the CRT 11. By applying the data for a single seismic trace to the Z-axis input of the CRT, a variable-density trace 14 is recorded on the photographic film 17 during one revolution of the drum plotter under control of the drive motor 21. The carriage 15 which supports the CRT 11 and the lens 12 is then indexed under control of the stepping motor 16 to the next seismic trace recording position. The data for the next seismic trace is then applied to the CRT 11 and recorded in side-by-side relationship to the previous seismic trace recording on the photographic film 17. In like manner, the carriage 15 is repeatedly indexed and variable-density seismic trace recordings are successively reproduced on the photographic film 17.

After all the seismic traces have been recorded, the photographic film is removed from the drum plotter and is processed in accordance with conventional film processing techniques. The processed seismic trace recording is useful in the interpretation of subsurface geological and geophysical alignments, structures, stratigraphic features, and the presence of gas, oil, or water content within certain parts of structures or features. Such interpretation can be improved by a color seismic recording in which each color hue or saturation is proportional to some geological or geophysical parameter. Such parameters can represent, for example, frequency distribution, polarity differences, amplitude variations, etc. Such a color seismic recording is produced in accordance with the present invention by making separate, half-toned, screened recordings for each selected parameter of the seismic data and then compositing these half-toned, screened recordings into a single, full-color photolithographic recording.

Figure 3:
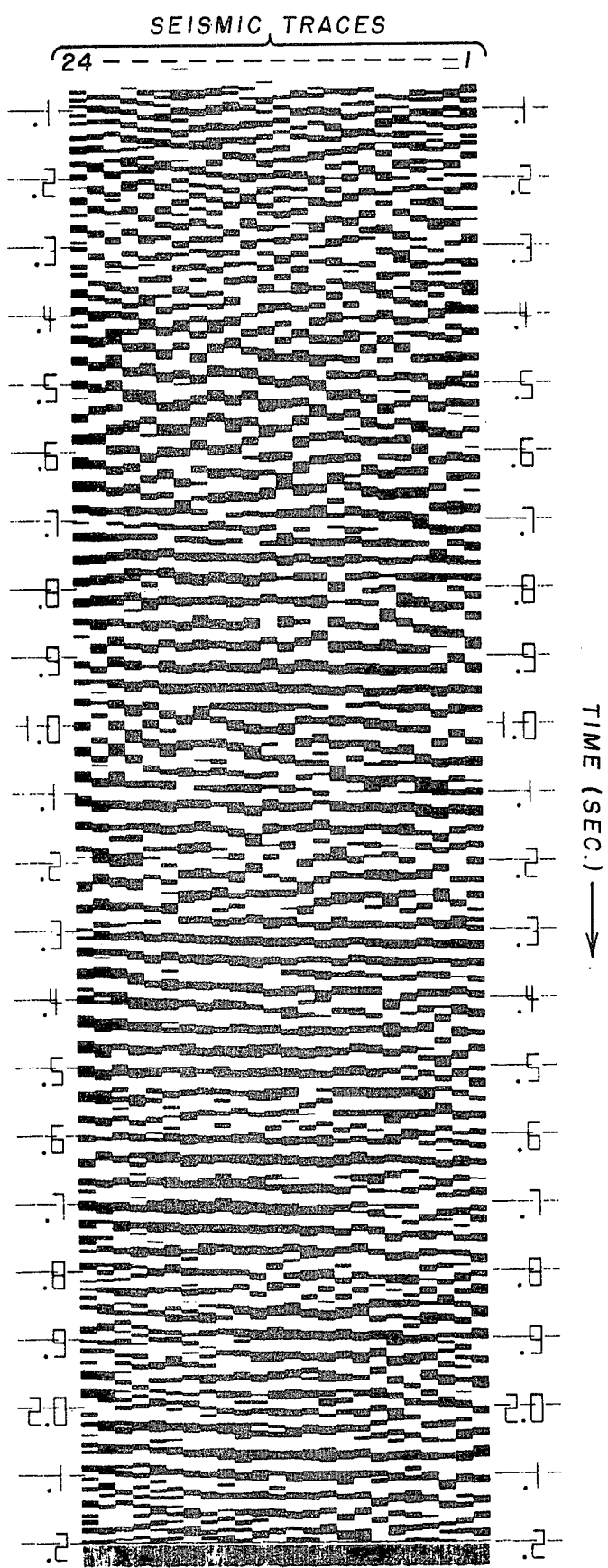
FIG. 3 represents a half-tone, variable-density recording of seismic signals made in accordance with the system of FIG. 1.

In producing separate, half-toned, screened recordings for each desired parameter of the seismic data, a photographic contact screen 18 is placed over the photographic film 17 on the drum plotter so that light from the variable-brightness trace of the electron beam as it moves across the face of the CRT 11 passes through the contact screen onto the photographic film. Both the screen and the film are clamped to the drum by means of the clamps 19 and 20 so that they remain stationary with respect to each other as the drum rotates. Such a screen comprises a plurality of crosslined squares which break up the images into tiny dots of varying sizes. The size of the resulting dots depends upon the amount of light which penetrates each square of the half-tone screen. Consequently, intermediate gray tones between black and white are produced on the photographic film in accordance with the brightness of the electron beam of the CRT under the control of the seismic information being applied to intensity modulate the electron beam. Such a half-tone, variable-density recording of positive polarities of seismic traces is illustrated in FIG. 3.

A full-color composite is then made by printing the photographic film for each of the selected parameters in a different color and then compositing the photographic films in sequence onto a single, full-color photographic recording, the amount of color laid down in the printing of each of the photographic films being controlled by the size of the dots on the photographic films. Such a composite can be made by any of several available processes such as, for example, color lithography, color xerography, or a dry pigment process such as Du Pont's CROMALIN color processing.

In carrying out the invention of screening variable-density seismic images as they are being recorded on photographic film, it has been found that a screen of about 65 to 200 lines per inch, for example, is suitable for seismic interpretation. Suitable contact screens can be ordered from Eastman Kodak Co., Rochester, N.Y.

It is to be understood that the foregoing-described embodiment of the invention may be utilized with any variable-brightness display means and recording means which are suitable for producing a half-tone, screened seismic record section. The detailed description of the intensity modulation of the electron beam of a cathode-ray tube and the photographic recording of the screened display of the electron beam as it sweeps across the face of the cathode-ray tube represent the operation only of the preferred embodiment of the invention. Various modifications to both the display means and the recording means may be utilized by those skilled in the art without departing from the scope and spirit of the invention as hereinafter defined by the appended claims.

We claim:

1. A method of producing a seismic color section having selected parameters of the seismic traces recorded in different colors, comprising the steps of:
    (a) selecting a first seismic parameter from the recorded seismic signals and applying said parameter sequentially by trace to a variable-brightness display to intensity modulate the brightness of said display,
    (b) screening the light emanating from said display,
    (c) recording said screened light whereby the images of said first seismic parameter are broken into a plurality of dots so as to produce a first half-tone, variable-density recording,
    (d) repeating steps (a)-(c) for each of a plurality of selected parameters of said seismic signals to produce a plurality of half-tone, variable-density recordings,
    (e) producing a different color photographic recording from each of said plurality of half-tone, variable-density recordings, the hue of each color being proportional to the value of the selected seismic parameter, and
    (f) producing a color composite of said plurality of different color photographic recordings, whereby each selected parameter is uniquely represented by a different color.

2. The method of claim 1 wherein at least one of said parameters is representative of frequency.

3. The method of claim 1 wherein at least one of said parameters is representative of magnitude.

4. The method of claim 1 wherein at least one of said parameters is representative of polarity.

* * * * *